(12) United States Patent
Jacksier et al.

(10) Patent No.: US 6,752,852 B1
(45) Date of Patent: Jun. 22, 2004

(54) APPARATUS FOR REMOVING MOISTURE FROM FLUIDS COMPRISING ACID GASES; METHODS OF USING SAME, AND COMPOSITIONS

(75) Inventors: Tracey Jacksier, Lisle, IL (US); Karine Saint-Cyr, Westmont, IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 10/157,467

(22) Filed: May 29, 2002

Related U.S. Application Data

(60) Provisional application No. 60/306,013, filed on Jul. 17, 2001.

(51) Int. Cl.[7] .............................................. B01D 53/02
(52) U.S. Cl. ................ 95/117; 95/49; 95/902; 96/108; 252/372
(58) Field of Search ................ 95/45, 49, 52, 95/90, 117, 241, 902; 96/4, 6, 8, 10, 108, 155, 219; 252/372; 423/522; 422/563

(56) References Cited

U.S. PATENT DOCUMENTS

| | | | | |
|---|---|---|---|---|
| 224,426 A | * | 2/1880 | Hartmann | .................. 423/563 |
| 722,981 A | * | 3/1903 | Herreshoff | .................. 423/522 |
| 4,270,937 A | * | 6/1981 | Adler et al. | .................. 62/625 |
| 4,358,627 A | * | 11/1982 | Ameen et al | |
| 5,385,689 A | * | 1/1995 | Tom et al | |
| 5,489,327 A | * | 2/1996 | Otsuka et al. | ................. 95/116 |
| 6,110,258 A | * | 8/2000 | Fraenkel et al | |
| 6,154,284 A | * | 11/2000 | McAndrew et al | |
| 6,359,070 B1 | * | 3/2002 | Bhada et al | |

* cited by examiner

*Primary Examiner*—Joseph Drodge
(74) *Attorney, Agent, or Firm*—Linda K. Russell; Christopher J. Cronin

(57) ABSTRACT

Methods and apparatus for reducing moisture content of fluids comprising moisture and a sulfur-containing compound are disclosed. The methods use an acid gas resistant molecular sieve, and the sulfur-containing compounds are preferably selected from the group consisting of carbondisulfide, carbonylsulfide, and compounds within the formula Y—S—X, wherein S is sulfur, and X and Y are the same or different and are independently selected from the group consisting of hydrogen, alkyl, aryl, oxygen, and alcohol. Compositions comprising the reduced moisture fluids are also described.

18 Claims, 2 Drawing Sheets

APPARATUS FOR REMOVING MOISTURE FROM FLUIDS COMPRISING ACID GASES; METHODS OF USING SAME, AND COMPOSITIONS

CROSS REFERENCE TO RELATED APPLICATIONS

This application claims the benefit of provisional application No. 60/306,013, filed Jul. 17, 2001.

BACKGROUND OF THE INVENTION

1. Field of the Invention

The invention is generally related to the field of moisture removal from gases and liquids. More specifically, the invention relates to apparatus adapted to reduce or remove moisture from gas-phase and liquid-phase acid gases, and methods of using same.

2. Related Art

Moisture is known to react with so-called "acid gases", such as hydrogen sulfide, carbonylsulfide, carbondlsulfide and mercaptans (mercaptans are also referred to as thiols) to form a complex compound. (The term "acid gas" is used herein to denote either gas phase, liquid phase, or mixture of gas and liquid phases, unless the phase is specifically mentioned.)

One problem presents itself: if one is interested in producing acid gas standard compositions, in other words acid gases having a known concentration of one of these gases in a matrix or carrier fluid, then one must consider how to reduce or remove the moisture. Gas standards may have to have, and preferably do have, a long shelf life, since the standard acid gas may not be required immediately after production. A source of acid gas may contain a considerable amount of moisture. Therefore, the reduction or removal of moisture from the acid gas is of primary importance if the stability of the acid gas in the standard gas is to be maintained.

Grossman et al. (U.S. Pat. No. 4,082,834) describes alloys, such as alloys of nickel, titanium, and zirconium, that react with water and reactive gases (such as hydrogen, hydrogen-containing compounds such as hydrocarbons, carbon monoxide, carbon dioxide, oxygen, and nitrogen) at temperatures ranging from about 200° C. to about 650° C. While the patent does not discuss acid gases, it is apparent that hydrogen sulfide, carbonyl sulfide, and mercaptans are hydrogen-containing compounds, so that there would not be any expected benefits using these alloys to remove moisture from these acid gases. While carbondisulfide does not contain hydrogen, and therefore there could be some moisture reduction from a composition comprising carbondisulfide and moisture using these alloys, the high temperature is prohibitive for commercial use.

Tamhankar et al. (U.S. Pat No. 4,713,224) describes a one-step process for removing minute quantities of impurities from inert gases, where the impurities are selected from the group consisting of carbon monoxide, carbon dioxide, oxygen, hydrogen, water and mixture thereof. The process comprises contacting the gas with a particulate material comprised of nickel in an amount of at least about 5% by weight as elemental nickel and having a large surface area, from about 100 to about 200 m²/g. There is no disclosure of removal of moisture from acid gases.

Tom et al (U.S. Pat Nos. 4,853,148 and 4,925,646) discloses processes and compositions for drying of gaseous hydrogen halides of the formula HX, where X is selected from the group consisting of bromine, chlorine, fluorine, and iodine. The patent describes the use of, for example, an organometallic compound such as an alkylmagnesium compound, on a support. The halide is substituted for the alkyl functional group. Suitable supports are, alumina, silica, and aluminosilicates (natural or synthetic). However, there is no description or suggestion of reducing or removing moisture from sulfur-containing compounds. Alvarez, Jr. et al. (U.S. Pat. No. 5,910,292) describes a process and apparatus for removal of water from corrosive halogen gases, using a high silica zeolite, preferably high silica mordenite. The patent describes removing moisture down to less than or equal to 100 ppb water concentration in halogen gases, particularly chlorine- or bromine-containing gases. U.S. Pat. No 6,183,539 discloses utilizing high sodium, low silica faujasite particles for the adsorption of carbon dioxide and water vapor from gas streams. The disclosed types of gas streams in which this type of high sodium, low silica faujasite crystals can be utilized includes air, nitrogen, hydrogen, natural gas, individual hydrocarbons and monomers, such as ethylene, propylene, 1.3 butadiene, isoprene and other such gas systems. There is no mention of sulfur-containing acid gas purification using the faujasites.

U.S. Pat. No. 4,358,627 discloses use of "acid resistant" molecular sieves, such as that known under the trade designation "AW300", for reducing the chloride concentration in chlorinated liquid hydrocarbons that contain an ethylenically unsaturated chlorinated hydrocarbon, water and hydrogen chloride. The method includes providing certain nitrogen-containing compounds in the system and contacting the system with the molecular sieve. There is no disclosure or suggestion, however, of removal or reduction of moisture from gas phase compositions, or removal or reduction of moisture from liquids comprising acid gases.

Given the problem of moisture reacting with sulfur-containing acid gases, it would be advantageous if apparatus and methods could be provided which reduce or overcomes the problem.

SUMMARY OF THE INVENTION

In accordance with the present invention, certain acid gas resistant molecular sieve compositions are employed to reduce or remove moisture from fluid compositions comprising a sulfur-containing compound. As used herein the term "remove" means that the water content of the final composition comprising the sulfur-containing compound will be equal to or less than 100 parts per billion (ppb), more preferably less than 10 ppb, and more preferably less than 1 ppb. As used herein the term "reduce" means that the moisture concentration of the final composition comprising the sulfur-containing compound will be no more than 0.1 times the starting fluid composition water concentration, preferably no more than 0.01 times, and more preferably no more than 0.001 times the starting moisture concentration. Presently, the detection limit for moisture is about 4 ppm in sulfur-containing fluids. Compositions are made to 4 ppm concentration, then diluted to the desired reduced moisture concentration. As used herein the term "sulfur-containing compound" includes carbondisulfide, carbonylsulfide, and compounds within formula (I):

$$Y\text{—}S\text{—}X \qquad (I)$$

wherein S is sulfur,

X and Y are the same or different and are independently selected from the group consisting of hydrogen, alkyl, aryl oxygen, and alcohol.

Examples of preferred sulfur-containing compounds within formula (I) include hydrogen sulfide, sulfur dioxide, methylthiol, ethylthiol, n-propylthiol, i-propylthiol, benzylthiol, and the like.

A first aspect of the invention relates to an apparatus comprising:
  a) a container having an internal space;
  b) an acid gas-resistant molecular sieve positioned within at least a portion of the internal space; and
  c) means for maintaining said molecular sieve within the container when a fluid comprising a sulfur-containing compound is caused to flow through the molecular sieve.

Preferred apparatus are those wherein the acid gas-resistant molecular sieve is selected from the group consisting of molecular sieves having an effective pore size ranging from about 1 Angstrom up to about 10 Angstroms, more preferably ranging from about 3 to about 8 Angstroms. Preferred are the molecular sieves known under the trade designations AW300 and AW500, particularly herein the molecular sieve is AW300 The molecular sieve is preferably positioned in the container so that substantially all of the sulfur-containing compound passes through the molecular sieve. Also preferred are apparatus wherein molecular sieve completely fills the internal space, and the means for maintaining the molecular sieve in the container is a material that is substantially inert to the sulfur-containing compound. Preferably, the means for maintaining the molecular sieve in the container is the molecular sieve material itself contacting an inner surface of the internal space. Also preferred are apparatus comprising an effluent conduit removably attached to the container, the effluent conduit adapted to route at least a portion of a moisture-depleted gas stream to a diode laser moisture measurement system.

A second aspect of the invention are fluid compositions comprising a sulfur-containing compound, the compositions having reduced moisture concentration, the compositions comprising at least one sulfur-containing compound having a sulfur-containing compound concentration, and water having a water concentration, the water concentration being no more than 0.1 times the concentration of the sulfur-containing compound. Preferred compositions are those wherein the water concentration is no more than 0.01 times the concentration of the sulfur-containing compound, more preferably no more than 0.001 times the concentration of the sulfur-containing compound. Preferred compositions of the invention are those wherein there is a single sulfur-containing compound having a sulfur-containing compound concentration of no more than 1 part per million (ppm), and wherein the water concentration is no more than 1 ppb.

Fluid compositions of the invention comprising a sulfur-containing compound and water vapor are preferably pure fluids of one acid gas, but the fluid may be a mixture of a single acid gas with another gas, such as an inert gas like nitrogen or argon. The fluid comprising acid gas may also comprise a mixture of two or more acid gases, either with or without another gas.

A third aspect of the invention is a method of reducing moisture content of fluids comprising moisture and a sulfur-containing compound, the method comprising the step of passing the fluid through the apparatus of the first aspect of the invention. Preferred methods within this aspect of the invention are those wherein the sulfur-containing compound is selected from the group consisting of carbondlsulfide, carbonylsulfide, and compounds within formula (I) above.

Preferably, processes within the third aspect of the invention are carried out at combinations of temperature and flow rate that will ensure water in the fluid will not freeze, and where the sulfur-containing compound will not decompose. Preferred temperatures range from just above 0° C. to just below a temperature where the sulfur-containing compound will decompose. Temperatures below 0° C. are disfavored because of the possibility of water freezing in the container, or in the molecular sieve pores, or both. Temperatures above the decomposition temperature are disfavored due to possible decomposition. It maybe possible, through increased flow rate (or decreased residence time) conditions in the container, to operate below 0° C. or exceed the decomposition temperature briefly. Generally it is preferred to operate at reduced temperature, as the acid gas resistant molecular sieve materials seem to operate more efficiently at these temperatures.

Further aspects and advantages of the invention will become apparent by reviewing the description of preferred embodiments that follow.

DESCRIPTION OF THE PREFERRED EMBODIMENTS

Figure 1:
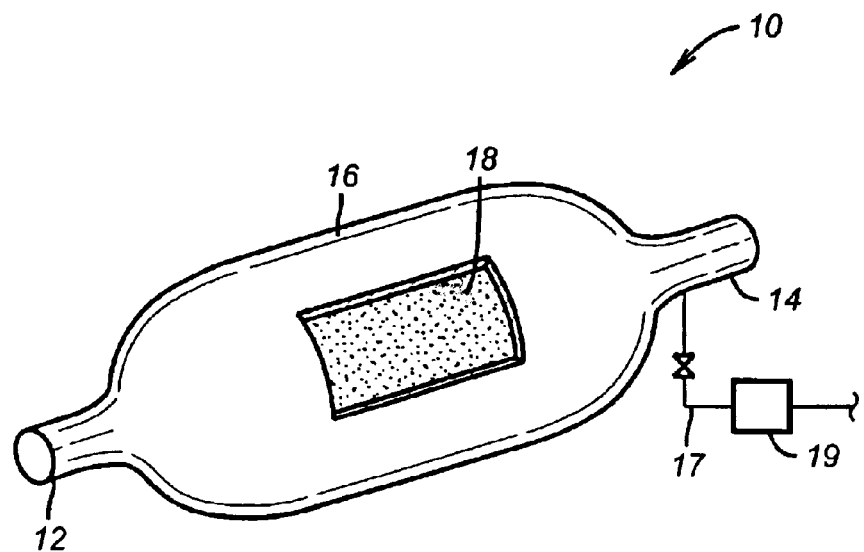
FIG. 1 is a schematic view (enlarged, within pieces cut away) of one apparatus embodiment of the invention.

Adsorption of moisture from fluid compositions comprising moisture and sulfur-containing compounds may be evaluated through several theories, with the exception that such theories do not recognize the benefits of use of an acid gas-resistant molecular sieve. The degree of adsorption of moisture onto the acid gas-resistant adsorbent depends in a complicated way on the chemical and physical properties of the adsorbent, the temperature and pressure employed during this step, as well as on the chemical and physical properties of the particular sulfur-containing fluid from which moisture is being removed. These parameters are in turn dictated by the final concentration of moisture in the sulfur-containing fluid that is to be produced.

A discussion of adsorption of gaseous species onto surfaces that is helpful in this respect is included in Daniels, F. et al., "Experimental Physical Chemistry", Seventh Edition, McGraw-Hill, pages 369–374 (1970). While the inventors are not certain, it is believed that the attraction of the reactive gas to the coating is physical in nature, involving an interaction of dipoles or induced dipoles, but may be chemical in nature involving chemical bonds, as when oxygen is adsorbed on charcoal. A combination of physical and chemical forces may be at work as well.

As stated in Daniels, et al., in a experimental data for adsorption may be plotted as adsorption isotherms, in which the quantity of gas adsorbed (expressed as milliliters at 0° C. and 760 mm) per gram of adsorbing material is plotted against the equilibrium pressure. In many cases of adsorption it is possible to relate the amount of adsorbed material to the equilibrium pressure, using the empirical equation of Freundlich, $$V = kP^n$$

where

V=number of milliliters of gas, corrected to 0° C. and 760 mm, adsorbed per gram of adsorbing material;

P=pressure; and k and n are constants that may be evaluated form the slope and intercept of the line obtained when log V is plotted against log P.

Alternatively, Langmuir considered adsorption to distribute molecules over the surface of the adsorbent in the form of a unimolecular layer. Consideration of the dynamic equilibrium between adsorbed and free molecules leads to the following relation:

$$P/V = P/V_u + 1/kV_u$$

Where P and V are as defined previously, $V_u$ is the volume of gas 0° C., 760 mm adsorbed per gram adsorbent when unimolecular layer is complete, and k is a constant characteristic of the adsorbent-adsorbate pair. Thus, if P/V is plotted against P, a straight line is obtained if the Langmuir equation applies. The slope of the line is equal to 1/Vu; when the line is extrapolated to low pressures, as P goes to 0, P/V approaches the finite limit 1/kVu. The values of the constant s may also be obtained by plotting 1/V versus 1/P. By postulating the building up of multimolecular adsorption layers on a surface, a Brunauer, Emmett, and Teller extended the Langmuir derivation for unimolecular layer adsorption to obtain an isotherm equation for the more complicated case. Thus, the surface area of a coating produced by the practice of the present invention may be determined by the B.E.T. method, and preferably is at least about 1 m²/gram, more preferably at least 10 m²/gram. If the coating is somewhat porous, the pore volume may be determined by nitrogen adsorption isotherm methods, and is preferably at least 0.1 ml/gram. The B.E.T. method is described in detail in Brunauer, S. Emmet, P. H., and Teller, E., J. Am. Chem. Soc., 60, 309–16 (1938). The nitrogen adsorption isotherm method is described in detail in Barrett, E. P., Joyner, L. G. and Helenda, P. P., J. Am. Chem. Soc., 73, 373–80 (1951), incorporated by reference herein.

As stated previously, the term "remove" means that the water content of the final composition comprising the sulfur-containing compound will be equal to or less than 100 ppb, more preferably less than 10 ppb, and more preferably less than 1 ppb. (As noted previously, these moisture concentrations are not presently measurable directly, but are obtained by dilution.) As used herein the term "reduce" means that the moisture concentration of the final composition comprising the sulfur-containing fluid will be no more than 0.1 times the starting fluid composition water concentration, preferably no more than 0.01 times, and more preferably no more than 0.001 times the starting moisture concentration.

The acid gas resistant molecular sieves useful in the invention are typically and preferably those described in Ameen et al. (U.S. Pat. No. 4,358,627), incorporated by reference herein. Preferred are the acid gas resistant molecular sieves known under the trade designations AW 300 and AW 500, available from Universal Oil Products (UOP). The effective pore size of the molecular sieve known under the trade designation AW 300 is about 4 Angstroms, and the effective pore size of the molecular sieve known under the trade designation AW 500 is about 5 Angstroms. A discussion of the acid gas resistant molecular sieves may be found in Collins, J. J., "A Report on Acid-Resistant Molecular Sieve Types AW-300 and AW-500", Oil and Gas Journal, Dec. 2, 1963, which is incorporated herein by reference. Such molecular sieves are available as pellets of diameters of about one eighth inch and one sixteenth inch.

As stated in U.S. Pat No. 4,358,627, molecular sieves are crystalline metal alumino-silicates. The molecular sieves are basically a 3-dimensional framework of $SiO_4$ and $AlO_4$ tetrahedra, the tetrahedra being cross-linked by the sharing of oxygen atoms so that the ratio of oxygen atoms to the total of the aluminum and silicon atoms is equal to 2. The elcetro valance of the tetrahedra containing aluminum is balanced by the inclusion in the crystal of a cation, for example an alkali or alkaline earth metal ion. One cation may be exchanged for another by ion exchange techniques, which are known. The spaces between the tetrahedra are occupied by water molecules prior to dehydration. The dehydration results in crystals interlaced with channels of molecular dimensions that offer very high surface areas for the adsorption of foreign molecules. In addition, the term "molecular sieve" as used in the present disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced. Most molecular sieves, or zeolites as they are also referred to, are prepared or occur naturally in the sodium form, so that sodium cations are associated with the electro negative sites in the crystal structure. However, the molecular sieve may be ion exchanged. Suitable cations for replacement of sodium in the molecular sieve crystal structure include ammonium (decomposable to hydrogen), hydrogen, rare earth metals, alkaline earth metals, and the like. Various suitable ion exchange procedures and cations which may be exchanged into crystal structure are well known to those skilled in the art. Examples of the naturally occurring crystalline aluminosilicate zeolites which may be used or included in the present invention are faujasite, mordenite, clinoptilote, chabazite, analcite, erionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptholite, nepheline, matrolite, offretite and sodalite. Examples of the synthetic alunino-silicate zeolites which are useful for carrying out the present invention are Zeolite X, U.S. Pat. No. 2,882,244, Zeolite Y, U.S. Pat. No. 3,130,007; and Zeolite A, U.S. Pat. No. 2,882,243; as well as Zeolite B, U.S. Pat. No. 3,008,803; Zeolite D, Canada Pat. No. 661,981; Zeolite E, Canada Pat. No. 614,495; Zeolite F, U.S. Pat. No. 2,996,358; Zeolite H, U.S. Pat. No. 3,010,789; Zeolite J, U.S. Pat. No. 3,001,869; Zeolite L, Belgian Pat. No. 575,177; Zeolite M, U.S. Pat. No. 2,995,423, Zeolite O, U.S. Pat. No. 3,140,252; Zeolite Q, U.S. Pat. No. 2,991,151; Zeolite S, U.S. Pat. No. 3,054,657, Zeolite T, U.S. Pat. No. 2,950,962; Zeolite W, U.S. Pat. No. 3,012,853, Zeolite Z, Canada Pat. No. 614,495; and Zeolite Omega, Canada Pat. No. 817,915. Also ZK-4HJ, alpha beta and ZSM-type zeolites are useful. Moreover, the zeolites described in U.S. Pat. Nos. 3,140,249, 3,140,253, 3,044,482 and 4,137,151 are also useful, the disclosures of said patents being incorporated herein by reference.

Referring now to the figures, FIG. 1 illustrates one apparatus 10 in accordance with the present invention, comprising a fluid inlet end 12, a fluid outlet end 14, a container 16, and an acid gas resistant molecular sieve 18 contained within an internal space within container 16. Container 16 may take any shape required by the user, including cylindrical, kidney shaped, spiral wound, and the like. Preferably container 16 is cylindrical. Fluid outlet end 16 may have a connection to a conduit 17 which preferably routes some or all of the effluent fluid, reduced in moisture content, to a means for moisture measuring 19. Means 19 is preferably a diode laser-based sensor, as described in U.S. Pat. Nos. 5,880,850; 5,963,336; and 6,154,284, all incorporated herein by reference. Such sensors typically include one or more diode laser sources, temperature control circuits, and the like, and a spectroscopic cell through which the diode laser passes through and encounters all or a portion of the gas sample being analyzed. Through an analysis of the absorbed radiation by the species of interest, in this case moisture, the concentration of the species of interest may be determined.

Figure 2:
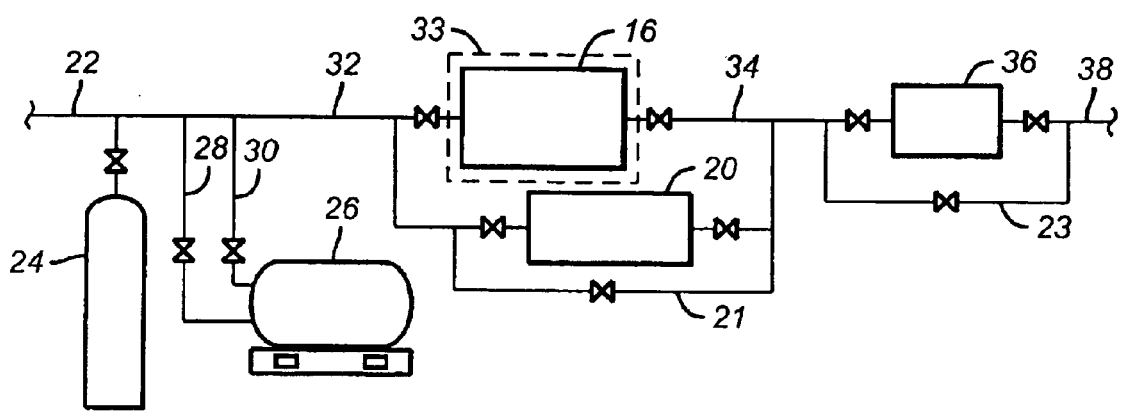
FIG. 2 is a schematic illustration of one method of using the apparatus illustrated in FIG. 1.

FIG. 2 illustrates a preferred process in accordance with the invention. A source of fluid 22, such as a tank or truck trailer (not shown), or other source of fluid such as cylinder 24 or ton unit 26 are illustrated. Ton unit may be a source liquid through conduit 28, or a source of gas through conduit 30. In any case, fluid comprising a sulfur-containing compound and moisture enter container 16 (as described in reference to FIG. 1). Container 16 may have a spare unit or units 20 installed in parallel to container 16. A bypass conduit 21 allows container 16 to be taken out of service and replaced, if necessary. Fluid depleted in moisture exits container 16 from conduit 24, and then may either enter a package (such as a cylinder, not shown) through bypass conduit 23 and conduit 38. Optionally, the moisture-depleted fluid may be passed through a downstream treatment unit 36, which is preferably a unit that removes particulate matter that may have escaped from the molecular sieve in container 16. An optional temperature control unit 33 is also illustrated. As a general rule, the acid gas resistant molecular sieves seem to work more efficiently at cooler temperatures (25° C. and lower), although one must be carefull not to freeze the moisture being removed. Also, there may be temperatures above 25° C. at which chemisorption contributes significantly to the overall adsorption, due to higher kinetic rate constants at higher temperatures. However, as temperature is increased even more, this effect will tend to be overcome by the physical desorption of moisture from the molecular sieve.

The means for maintaining the molecular sieve in the container is a material that is substantially inert to the acid gas. Preferably, the means for maintaining the molecular sieve in the container is the molecular sieve material itself contacting an inner surface of the container. For economic reasons, it may be preferred to hold the acid gas-resistant molecular sieve in a secondary or material inside the container, such as with end screens in the fluid entrance and exit ends made from porous metals such as stainless steels, aluminum, VCR connections, gaskets, frits, and the like. Further it may be preferred to mix the acid gas-resistant molecular sieve with one or more non-acid gas-resistant materials, preferably another molecular sieve material. It is within the invention to use more than one container, either in parallel or series arrangement in terms of flow of feed fluid. For example, it may be desired to have a series arrangement, where the second or succeeding containers have dame or different molecular sieve materials. In parallel arrangements, it is preferred to have two containers with the same molecular sieve in each container, and to effect flow in one container while the other container is being regenerated, such as by heating, contacting with dry fluid, or combination of these. Such parallel and series arrangements are known in the adsorption art, for example, the air separation field.

A second aspect of the invention are fluid compositions comprising a sulfur-containing compound, the compositions having reduced moisture concentration, the compositions comprising at least one sulfur-containing compound having a sulfur-containing compound concentration and a moisture concentration, the moisture concentration being no more than 0.1 times the concentration of the sulfur-containing compound. Fluid compositions may either have one sulfur-containing compound, or more than one. If more there are two sulfur-containing compounds, the molar ratio of the two may range from about 1:99 to about 99:1, more preferably from about 20:80 to about 80:20, and more preferably ranging from about 40:60 to about 60:40. Examples of fluid compositions considered within the invention include a mixture of carbonylsulfide and hydrogen sulfide, the molar ratio of carbonylsulfide to hydrogen sulfide ranging from about 20:80 to about 80:20; mixtures of hydrogen sulfide and methylthiol (otherwise known as methyl mercaptan), with molar ratio of hydrogen sulfide to methylthiol ranging from about 20:80 to about 80:20, and the like.

A third aspect of the invention is a method of reducing moisture content of fluids comprising moisture and a sulfur-containing compound, the method comprising the step of passing the fluid through the apparatus of the first aspect of the invention. Preferred methods within this aspect of the invention are those wherein the sulfur-containing compound is selected from the group consisting of carbondlsulfide, carbonylsulfide, and compounds within formula (I). The flow rate of the fluid comprising moisture and on or more sulfur-containing compounds will be sufficient to create a space velocity preferably of at least one container volume per minute, more preferably at least about 5container volumes per minute. This of course will depend on the temperature of the feed fluid, the amount of moisture in the feed fluid, the flow pattern through the apparatus of the invention. If the fluid is gaseous, higher temperatures and higher flow rates will tend to create more difficulty in removing moisture from the fluid, as the volume of the fluid will tend to be larger and there will be less contact time. Conversely, in general lower temperatures and lower feed rates will be beneficial in removing more moisture. The feed pressure is not critical, but it should not be so high as to render the pressure drop through the container too high, lest the molecular sieve be damaged. Preferably, a means for filtering the product fluid is provided (downstream of the molecular sieve) to filter out and particles of molecular sieve that may break away form the main portion.

Figure 3:
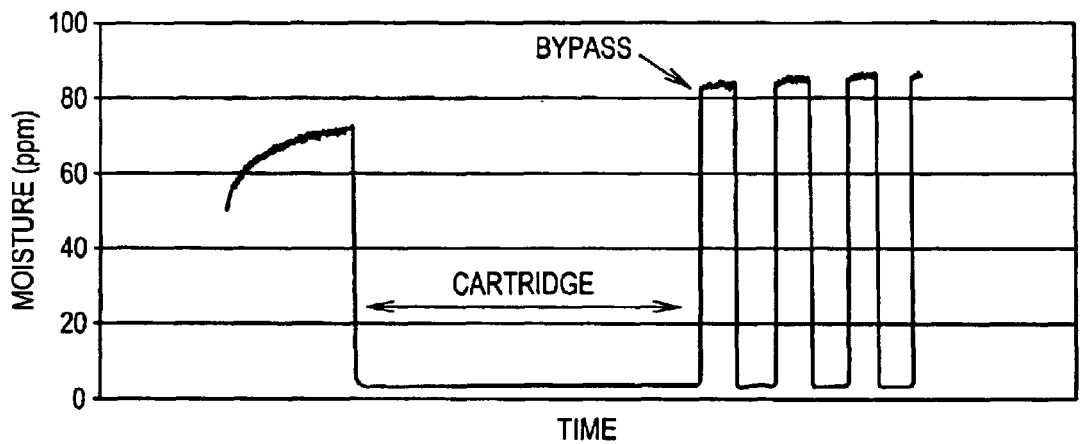
FIG. 3 is a graph illustrating moisture removal data from hydrogen sulfide in one embodiment of the invention.

FIG. 3 is a graph illustrating moisture removal data from hydrogen sulfide in one embodiment of the invention. The apparatus comprised 14 grams of the molecular sieve known under the trade designation AW300, which had flowing there through a gas stream comprising hydrogen sulfide and from about 60 to about 80 ppm of moisture. The test was conducted at room temperature (about 20° C.) The flow rate of the gas stream through the molecular sieve was 1 liter/minute. The moisture in the stream exiting the apparatus was measured using a diode laser measurement system, such as described in U.S. Pat. Nos. 5,880,850; 5,963,336; and 6,154,284, previously incorporated herein by reference, although other means for moisture analysis could be used as well. As may be seen in the data of FIG. 3, the molecular sieve worked extremely well in reducing the moisture level of the hydrogen sulfide stream.

Figure 4:
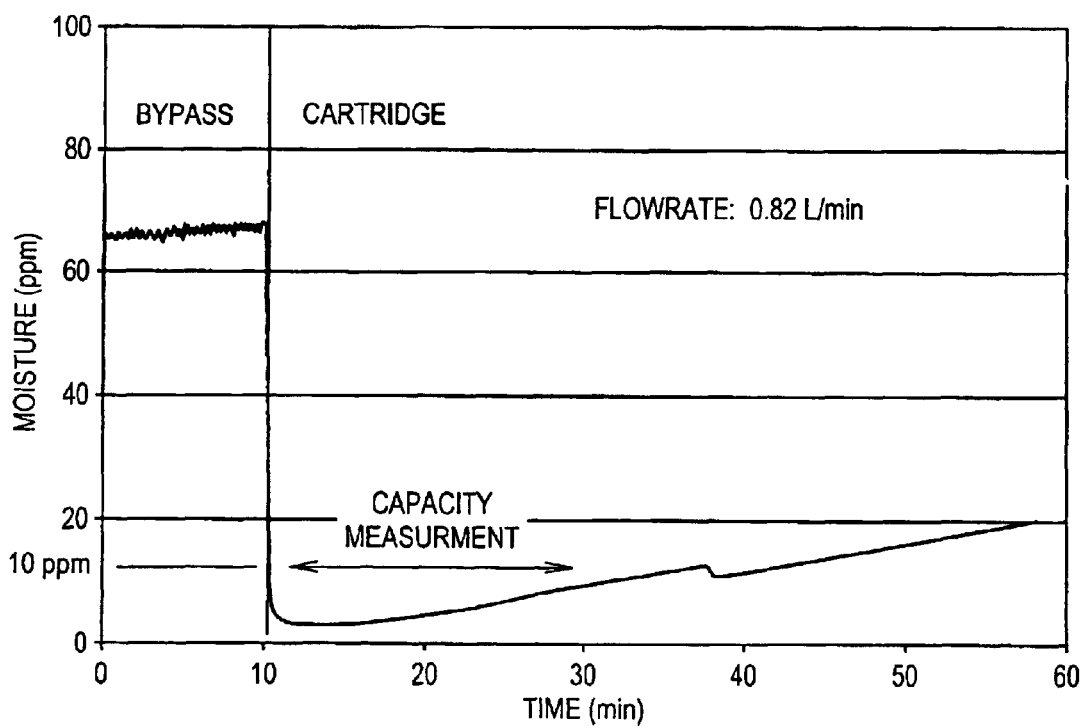
FIG. 4 is graph illustrating test results for moisture removal capacity of an apparatus of the invention.

FIG. 4 is graph illustrating test results for moisture removal capacity of the apparatus of the invention described in reference to FIG. 3. The capacity to remove moisture down to 10 ppm concentration, for this particular apparatus, was about 20–25 minutes, at a gas flow rate of 0.82 liter/minute.

Additional experiments were performed on sulfur dioxide streams, and similar moisture removal abilities were observed.

Although the description herein is intended to be representative of the invention, it is not intended to limit the scope of the appended claims.

What is claimed is:

1. A fluid composition comprising:
   a) at least one acidic sulfur-containing compound having a known concentration of no more than 1 ppm; and
   b) water having a determined concentration of more than 0.1 times the concentration of the at least one acidic sulfur-containing compound.

2. The composition of claim 1 wherein the water concentration is no more than 0.01 times the concentration of the at least one acidic sulfur-containing compound.

3. The composition of claim 1 wherein the water concentration is no more than 0.001 times the concentration of the at least one acidic sulfur-containing compound.

4. The composition of claim 1 wherein there is only one acidic sulfur-containing compound and wherein the water concentration is no more than 1 ppb.

5. The composition of claim 1, wherein each one of said at least one sulfur-containing compound is selected from the group consisting of carbondisulfide, carbonylsulfide, and compounds having the following formula (I):

$$Y-S-X \tag{I}$$

wherein S is sulfur, and

X and Y are the same or different and are independently selected from the group consisting of hydrogen, alkyl, aryl, oxygen, and alcohol.

6. A system for generating a fluid composition having a reduced moisture level, comprising:
   a) a source of a fluid composition comprising at least one acidic sulfur-containing compound having a known concentration of no more than one ppm and water having a determined concentration;
   b) a container fluidly communicating with said source for receiving said fluid composition, said container containing an acid gas resistant molecular sieve, said acid gas resistant molecular sieve having a property of reducing a moisture level of the fluid composition when said fluid composition is caused to flow therethrough; and
   c) a package fluid communicating with said container for receiving said fluid composition having a determined reduced moisture level, a water concentration of said reduced moisture level fluid composition being no more than 0.1 times the concentration of the at least one acidic sulfur-containing compound.

7. The system of claim 6, wherein said acid gas-resistant molecular sieve is selected from the group consisting of molecular sieves having an effective pore size ranging from about 1 Angstrom up to about 10 Angstroms.

8. The system of claim 7, wherein said effective pore size ranges from about 3 to about 8 Angstroms.

9. The system of claim 6, wherein said molecular sieve is positioned in said container so that substantially all of said at least one acidic sulfur-containing compound passes through said molecular sieve.

10. The system of claim 6, wherein said molecular sieve completely fills an internal space of said container.

11. The system of claim 6, further comprising a means for maintaining said molecular sieve in said container, said means being a material that is substantially inert to said at least one acidic sulfur-containing compound.

12. The system of claim 11, wherein said means and said molecular sieve are of a same material.

13. The system of claim 6, further comprising an effluent conduit fluidly communicating between said container and said package, said effluent conduit adapted to route at least a portion of said moisture-reduced fluid composition to a diode laser moisture measurement system.

14. The system of claim 6, wherein each one of said at least one sulfur-containing compound is selected from the group consisting of carbondisulfide, carbonylsulfide, and compounds having the following formula (I):

$$Y-S-X \tag{I}$$

wherein S is sulfur, and

X and Y are the same or different and are independently selected from the group consisting of hydrogen, alkyl, aryl, oxygen, and alcohol.

15. A method of reducing a moisture content of a fluid composition comprising at least one acidic sulfur-containing compound having a known concentration of no more than one ppm and water having a determined concentration, the method comprising the steps of:
   a) providing a source of the fluid composition;
   b) providing a container fluidly communicating with the source for receiving the fluid composition, the container containing an acid gas resistant molecular sieve, the acid gas resistant molecular sieve having a property of reducing a moisture level of the fluid composition when the fluid composition is allowed to flow therethrough;
   c) providing a package fluidly communicating with the container for receiving the fluid composition having a reduced moisture level;
   d) allowing the fluid composition from the source to flow through the acid gas resistant molecular sieve to reduce a moisture level of the fluid composition; and
   e) allowing the reduced moisture level fluid composition to flow from the acid gas resistant molecular sieve to the package, wherein a determined water concentration of the reduced moisture level fluid composition is no more than 0.1 times the concentration of the at least one acidic sulfur-containing compound.

16. The method of claim 15 wherein each one of the at least one acidic sulfur-containing compound is selected from the group consisting of carbondisulfide, carbonylsulfide, and compounds having the following formula (I):

$$Y-S-X \tag{I}$$

wherein S is sulfur, and

X and Y are the same or different and are independently selected from the group consisting of hydrogen, alkyl, aryl, oxygen, and alcohol.

17. The method of claim 15 wherein the molecular sieve is selected such that as a temperature of the fluid composition is reduced, moisture removal by the moleculor sieve increases.

18. The method of claim 15 wherein the molecular sieve is selected such that as a temperature of the molecular sieve is reduced, moisture removal from the fluid composition increases.

* * * * *

UNITED STATES PATENT AND TRADEMARK OFFICE
CERTIFICATE OF CORRECTION

PATENT NO. : 6,752,852 B1
DATED : June 22, 2004
INVENTOR(S) : Tracey Jacksier and Karine Saint-Cyr Page 1 of 1

It is certified that error appears in the above-identified patent and that said Letters Patent is hereby corrected as shown below:

Column 9,
Line 8, please replace the word "of" with the word -- no --.
Line 45, please replace the word "fluid" with the word -- fluidly --.

Signed and Sealed this

Fourteenth Day of December, 2004

JON W. DUDAS
*Director of the United States Patent and Trademark Office*